(12) United States Patent
Koizumi et al.

(10) Patent No.: US 6,721,128 B1
(45) Date of Patent: *Apr. 13, 2004

(54) CLOSURE SEAL FOR A STORAGE DEVICE

(75) Inventors: Yoshiaki Koizumi, Kawasaki (JP); Shinichi Fukuzawa, Kawasaki (JP); Kiyoko Morii, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,621

(22) Filed: Dec. 23, 1997

(30) Foreign Application Priority Data

May 30, 1997 (JP) ............................................. 9-141607

(51) Int. Cl.[7] ............................................... G11B 33/14
(52) U.S. Cl. .................................... 360/97.02; 369/75.1
(58) Field of Search ........................... 360/97.02, 99.08, 360/133, 98.07, 97.01, 97.03, 106, 132, 98.01, 99.12; 369/75.1; 493/111; 174/50; 413/1; 312/9.1; 49/68

(56) References Cited

U.S. PATENT DOCUMENTS

| | | | | |
|---|---|---|---|---|
| 4,772,974 A | * | 9/1988 | Moon et al. ................... 360/98 |
| 5,001,298 A | * | 3/1991 | Jong ........................ 174/35 R |
| 5,214,549 A | * | 5/1993 | Baker et al. ............. 360/97.02 |
| 5,301,075 A | * | 4/1994 | Takemoto ................ 360/97.02 |
| 5,446,609 A | * | 8/1995 | Thanos et al. ........... 360/97.02 |
| 5,582,411 A | * | 12/1996 | Tyler ............................. 277/23 |
| 5,590,114 A | * | 12/1996 | Murphy ...................... 369/290 |
| 5,600,509 A | * | 2/1997 | Kawakami ............... 360/97.02 |
| 5,666,239 A | * | 9/1997 | Pottebaum ............... 360/97.03 |
| 5,671,103 A | * | 9/1997 | Tada ........................ 360/97.02 |
| 5,844,754 A | * | 12/1998 | Stefansky et al. .......... 360/106 |
| 5,877,915 A | * | 3/1999 | Ishida ..................... 360/97.03 |
| 5,886,850 A | * | 3/1999 | Kaczeus et al. ......... 360/97.01 |
| 6,037,541 A | * | 3/2000 | Bartley et al. ................ 174/66 |
| 6,088,190 A | * | 7/2000 | Anderson ................ 360/97.02 |
| 6,327,115 B1 | * | 12/2001 | Satoh et al. ............. 360/99.08 |
| 6,385,006 B1 | * | 5/2002 | Kaczeus et al. ......... 360/97.01 |

FOREIGN PATENT DOCUMENTS

WO  WO 90/05982  * 5/1990  ............. 360/97.02

OTHER PUBLICATIONS

"Method of Sealing Disk Files" IBM TDB NN9004295 v32 n11 Apr. 1, 1990 pp 295–296.*
"Sealing of Debris in N58 Slider Pockets" IBM TDB NN9212387 v35 n7 Dec. 1, 1992 pp. 387–388.*

* cited by examiner

Primary Examiner—Dung C. Dinh
(74) Attorney, Agent, or Firm—Staas & Halsey LLP

(57) ABSTRACT

A closure seal for a storage device, such as a disk storage device, to block the flow of air into and out of the storage device. The storage device includes a base to support and contain mechanisms for accessing a storage medium, a cover to cover the base, and a single sheet closure seal to seal a boundary between the base and the cover, and to seal apertures in the base and cover. To prevent the formation of bubbles in the closure seal, at least one of the closure seal, the cover, and the surface to which the closure seal is affixed include at least one ventilation hole to release air during the operation of affixing the closure seal.

41 Claims, 7 Drawing Sheets

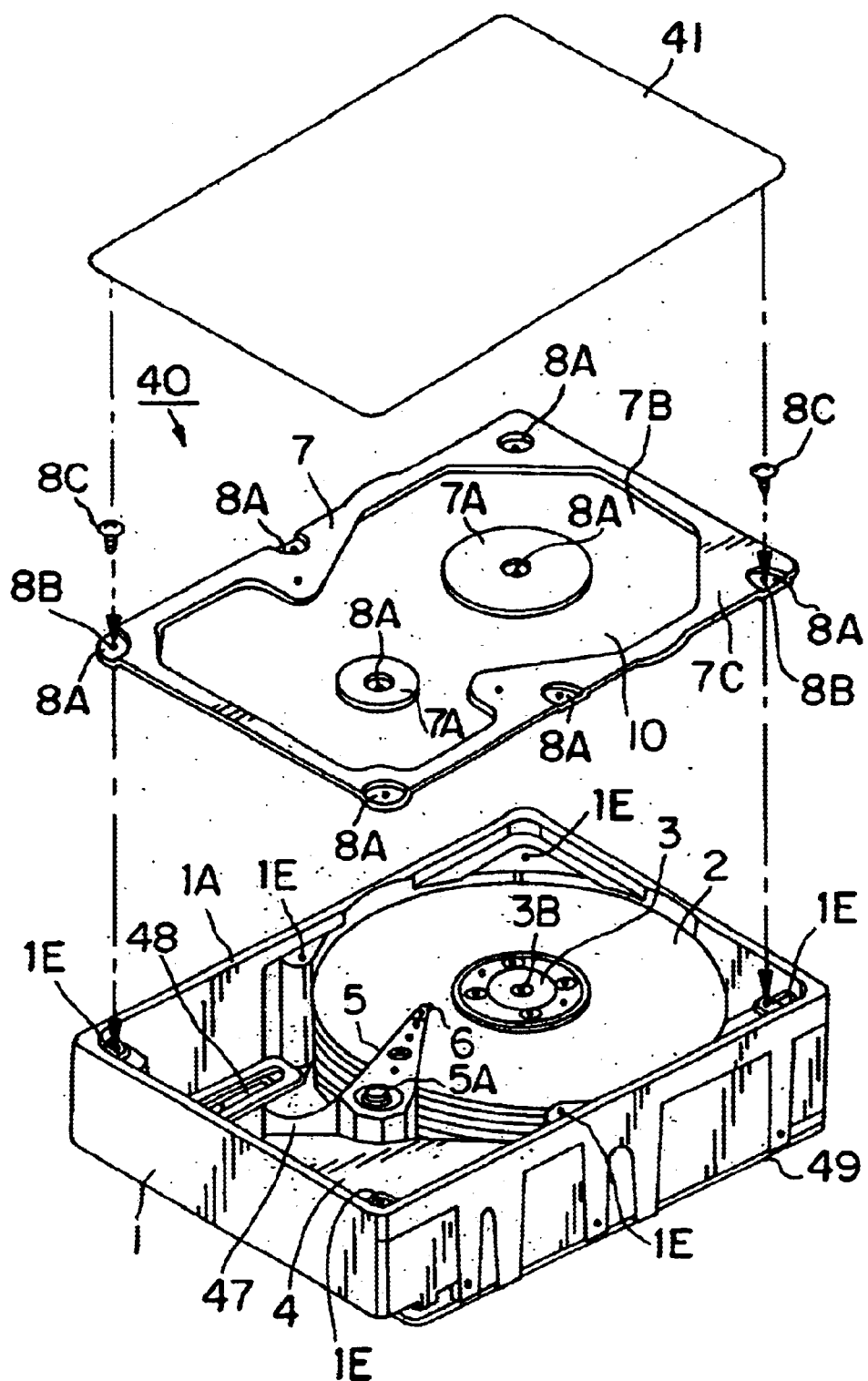
F I G. 1

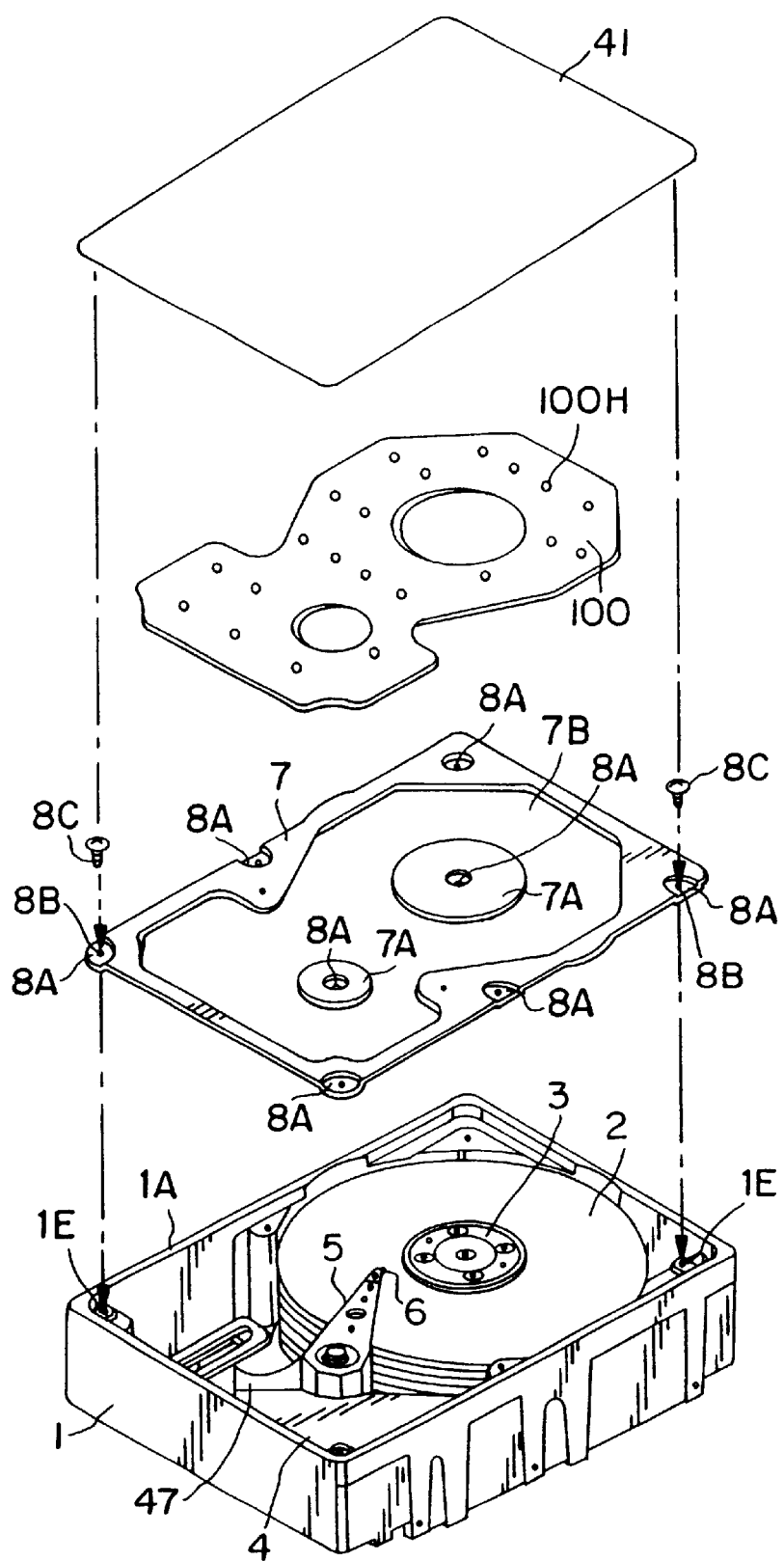
F I G. 6

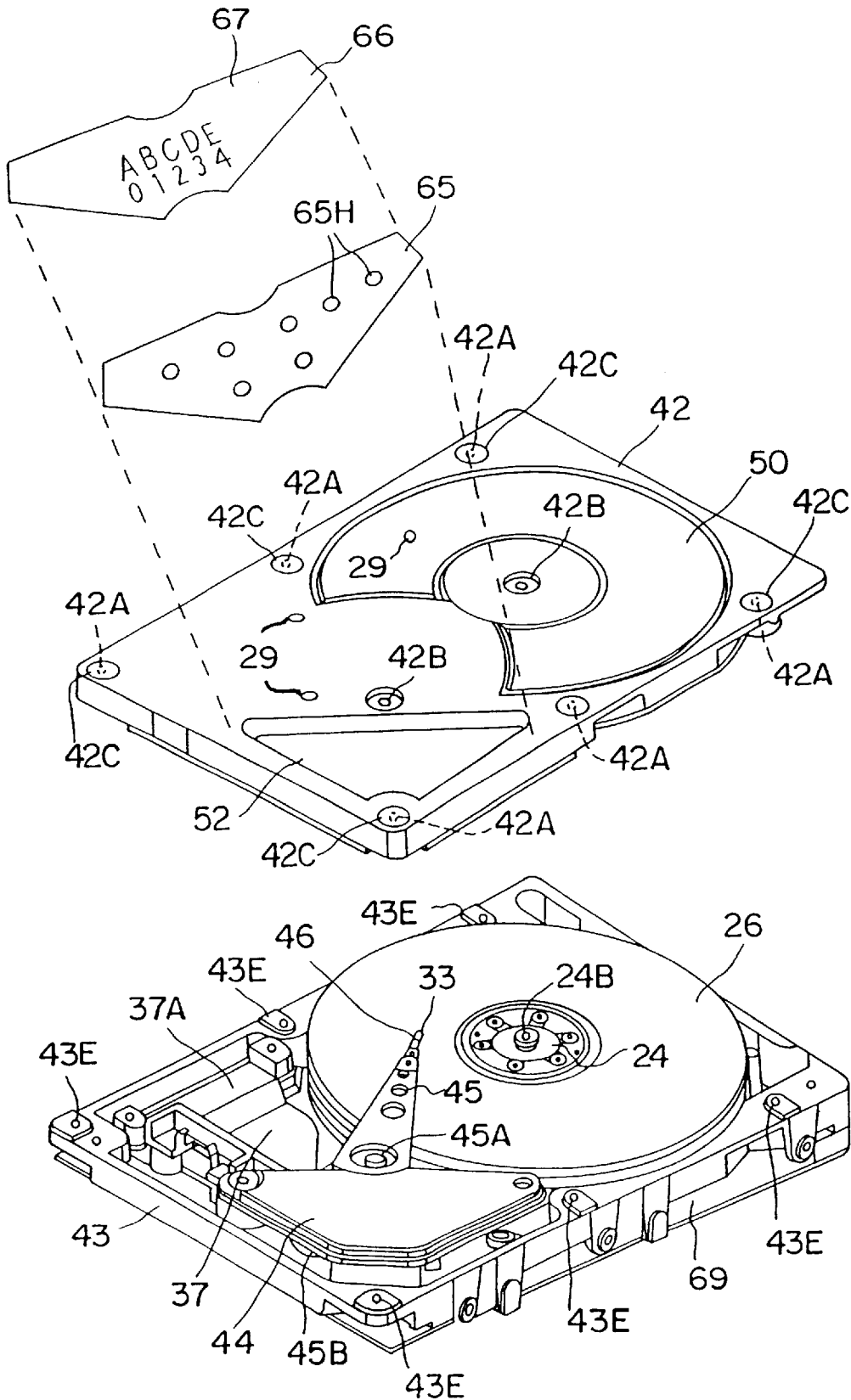
F I G. 7

CLOSURE SEAL FOR A STORAGE DEVICE

BACKGROUND OF THE INVENTION

1. Field of the Invention

The present invention relates to a storage device for storing computer data, such as a magnetic disk storage device, an optical disk storage device, or the like, and, more particularly, the present invention relates to a computer storage device having a closure seal to block the flow of air into and out of the storage device, which closure seal is reliably affixed and has an increased degree of sealing.

2. Description of the Related Art

In recent years, magnetic disk devices, optical disk devices, and the like disk devices have been used as storage devices for computers. Furthermore, both the storage capacity of the disk devices and the speed of the transfer of signals between read/write heads and disk device control circuits of the disk devices have increased recently. In the case that the physical size of the disk storage device is set, an increase in the storage capacity of the disk is effected by increasing the number of storage tracks per inch (TPI), thereby making the pitch of the disk storage tracks narrower and the track density greater.

When the track density of a magnetic disk device is increased accompanying an increase in TPI, it is necessary to considerably reduce the flotation amount of the heads to increase the storage and playback characteristics of the heads. However, the flotation characteristics of the heads are adversely affected by even a small amount of dust. The adverse affects on the flotation characteristics of the heads caused by dust include running away of the heads, or collision of the heads with the disk, thereby damaging the heads or the disk, decreasing the process efficiency of data transfer, and thus decreasing the reliability of the storage device. Accordingly, it is desired to reliably perform sealing of disk storage devices, particularly disk storage devices having higher density tracks.

The conventional magnetic disk storage device consists of a housing (casing) having a base on which the components of the magnetic disk device are situated, and a cover superposed on the base to cover the base. To maintain sealing within the conventional magnetic disk storage device, packing is inserted in a boundary portion between the base and the cover. Furthermore, the base and the cover are made integral by connecting the base and cover via screws passed through screw holes in the cover and the base. The screw holes are disposed in screw hole grooves formed by a step down from the cover surface so that the screw heads do not project from the cover surface. After tightening the screws, a closure seal somewhat larger than the size of the screw hole groove is affixed to each screw hole groove to cover the screw hole grooves.

When there are a plurality of screw holes in the cover surface, it is necessary to affix a closure seal facing each screw hole groove associated with the plurality of screw holes, thus requiring a skilled operation, and a large amount of time. Furthermore, when affixing the closure seal to the surface of the housing, air bubbles are easily formed between the closure seal and the housing surface. The air remaining in the air bubbles protrudes out beyond the working dimensions of the device, causing a risk of problems as a result of impairment of the seal formed by the closure seal. More specifically, the air remaining in the air bubbles causes impairment of the closure seal as a result of swelling due to an increase in temperature. Moreover, another problem occurs in that the air bubbles spoil the external appearance of the device. Further, assembly costs are increased because exceptional care and time are necessary for the operation of affixing the closure seal.

SUMMARY OF THE INVENTION

It is an object of the present invention to provide a storage device having a closure seal, and which is suitable for mass production, and has an improved sealing operation.

It is another object of the present invention to provide a storage device including a closure seal providing a strengthened seal and increased durability and reliability.

It is another object of the present invention to provide a disk storage device, suitable for storing computer data, including a single sheet closure seal for sealing the disk storage device to prevent air from entering the disk storage device.

Objects and advantages of the present invention are achieved in accordance with embodiments of the present invention with a storage device, suitable for storing computer data, comprising a base to support a mechanism for accessing a storage medium; a cover to cover the base, the cover including an aperture; and a closure seal comprised of a single sheet to seal a boundary of the base and the cover, and to seal the aperture of the cover.

In accordance with embodiments of the present invention, a plurality of positions of the storage device are sealed using a single sheet closure seal, and the operability of the storage device is increased. Furthermore, the flatness of the surface to which the closure seal is affixed is increased.

In accordance with embodiments of the present invention, the closure seal may comprise a single sheet to cover the entire surface of the cover and the base adjacent the boundary of the base and the cover.

In accordance with embodiments of the present invention, the aperture may comprise a hole, or a groove provided with a hole, in which a screw is inserted. Further, the cover may include a plurality of apertures.

In accordance with embodiments of the present invention, the closure seal may comprise a ventilation hole in a position separated from the boundary and the aperture. Further, the closure seal may comprise a plurality of ventilation holes.

In accordance with embodiments of the present invention, the storage device further comprises a member to which the closure seal is affixed, and the member includes a ventilation hole in a surface to which the closure seal is affixed. Further, the member may comprise a plurality of ventilation holes in the surface to which the closure seal is affixed.

In accordance with embodiments of the present invention, the closure seal is affixed to a surface of the cover, and the cover comprises a ventilation hole in the surface to which the closure seal is affixed. Further, the cover may comprise a plurality of ventilation holes.

In accordance with the embodiments of the present invention, the storage device further comprises a damping plate on a surface of the cover or on a surface of the base, and the damping plate includes a ventilation hole in the surface to which the closure seal is affixed. Further, the damping plate may include a plurality of ventilation holes in the surface to which the closure seal is affixed.

In accordance with embodiments of the present invention, when affixing the closure seal, the closure seal is pressed to a surface to which it is affixed and air escapes through the ventilation holes. As a result of the escape of air through the ventilation holes, the formation of air bubbles is advantageously prevented and the durability of the closure seal is increased. Moreover, since air escapes through the ventilation holes, an increased flatness of the surface to which the closure seal is affixed can be advantageously achieved.

Furthermore, in accordance with embodiments of the present invention, the ventilation holes are disposed in positions separated by at least 1 millimeter (mm) from the boundary of the base and cover, and/or from the aperture. Accordingly, there is no loss of sealing, the formation of bubbles is prevented, and the durability of the closure seal is increased.

Furthermore, in accordance with embodiments of the present invention, the ventilation holes have a one of a circular, polygonal or cross-shaped configuration. Accordingly, the ventilation holes are formed without any adverse effects on the strength and durability of the closure seal.

Furthermore, in accordance with embodiments of the present invention, the cover fits into an inner peripheral surface of an upper portion of the base, and an upper end surface of the cover and an upper end surface of the base have dimensions which together form a flat surface for affixing the closure seal. Accordingly, by making the difference in level between the upper end surface of the cover and upper end surface of the base small or none at the boundary of the base and cover, the closure seal is flat at the boundary position of the base and cover, and the durability of the closure seal is increased.

Objects and advantages of the present invention are achieved in accordance with another embodiment of the present invention with a storage device comprising a base to support a mechanism for accessing a storage medium, the base including an aperture; a cover to cover the base, the cover including an aperture; and a closure seal comprising a single sheet to seal an aperture of the base and/or the cover, wherein the closure seal includes a ventilation hole in a position separated from the apertures.

In accordance with embodiments of the present invention, the base may include a plurality of apertures. Further, the cover may include a plurality of apertures, and a plurality of ventilation holes separated from the apertures.

In accordance with embodiments of the present invention, there is no loss of sealing, the formation of air bubbles in the closure seal is prevented, and the surface to which the closure seal is affixed can be flattened. As a result, the durability of the closure seal is if increased.

Moreover, in accordance with embodiments of the present invention, the ventilation holes are positioned away from markings on the closure seal, such as characters, symbols, or diagrams. Accordingly, the formation of air bubbles in the closure seal is prevented without obscuring the characters, symbols or diagrams, and the durability of the closure seal is increased.

Objects and advantages of the present invention are achieved in accordance with yet another embodiment of the present invention with a storage device comprising a base to support a mechanism for accessing a storage medium, the base including an aperture; a cover to cover the base, the cover including an aperture; a closure seal comprising one sheet to seal an aperture of the base and/or the cover, wherein the closure seal is affixed to a surface having a ventilation hole.

In accordance with embodiments of the present invention, the storage device further comprises a damping on one of the cover or the base, and the closure seal is affixed to one of the cover, the base, the damping plate, or components exposed to the exterior from the cover or the base.

In accordance with the embodiments of the present invention, the formation of air bubbles is prevented without any loss of sealing, the surface to which the closure seal is affixed is flattened, and the durability of the closure seal is increased.

In accordance with embodiments of the present invention, the storage device further comprises a reinforcing plate member, and the reinforcing plate member has at least one through hole disposed on the inside surface opposite the aperture. The reinforcing plate member is preferably a film made of metal or plastic.

In accordance with embodiments of the present invention, the strength of the closure seal is reinforced, the formation of air bubbles is prevented and the durability of the closure seal is increased. Moreover, the reinforcing plate member is easily made from sheet metal by press technology. Alternatively, the reinforcing plate member can easily be made of natural rubber and the like resins or formed by synthetic plastics technology by molding or cutting.

DESCRIPTION OF THE DRAWINGS

These and other objects and advantages of the invention will become apparent and more readily appreciated from the following description of the preferred embodiments, taken in conjunction with the accompanying drawings of which:

FIG. 1 is an exploded oblique view of a magnetic disk device in accordance with a first embodiment of the present invention.

FIG. 6 is an exploded oblique view of a magnetic disk device in accordance with the fourth embodiment of the present invention.

FIG. 7 is an exploded oblique view of a magnetic disk device in accordance with a fifth embodiment of the present invention.

DETAILED DESCRIPTION OF THE PREFERRED EMBODIMENTS

Figure 2A:
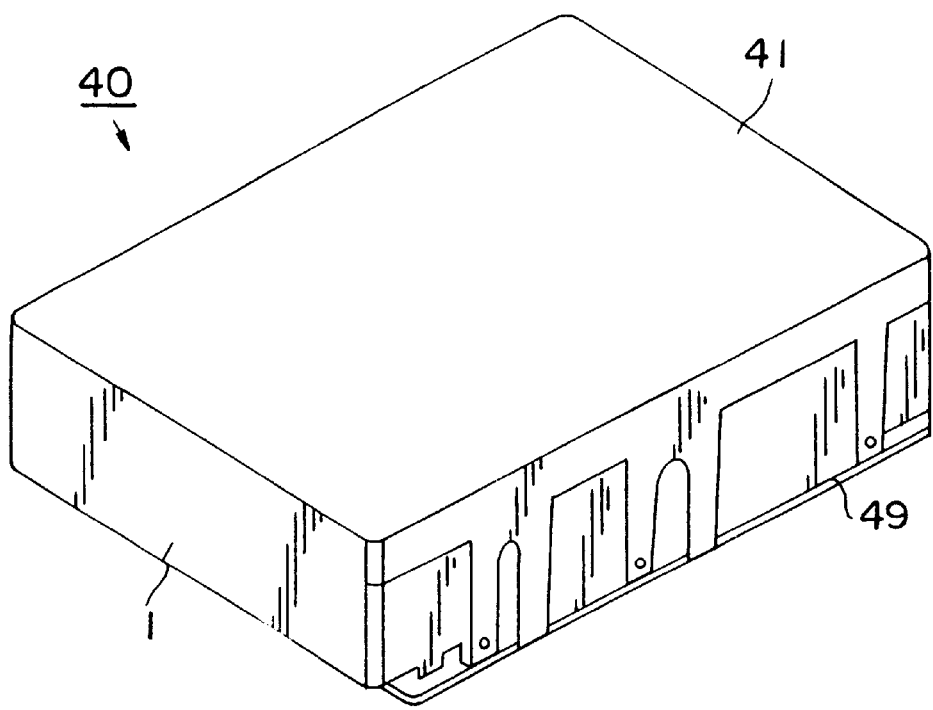
FIG. 2A is an overall oblique view of the magnetic disk device shown in FIG. 1 in accordance with the first embodiment of the present invention.

Reference will now be made in detail to the preferred embodiments of the present invention, examples of which are illustrated in the accompanying drawings, wherein like reference numerals refer to like elements throughout.

In accordance with the embodiments of the present invention described hereinbelow, the storage device is preferably a magnetic disk storage device. However, the present invention is not limited in application to a magnetic disk storage device, and the present invention is also applicable to other types of disk storage devices, such as optical disks, and the like.

A first embodiment of the present invention will now be described with reference to FIGS. 1, 2A and 2B. FIG. 1 is an exploded oblique view of a magnetic disk device in accordance with the first embodiment of the present invention. FIG. 2A is an overall oblique diagram of the magnetic disk device shown in FIG. 1, and FIG. 2B is a cross sectional diagram in the length direction of the magnetic disk device shown in FIG. 1.

Figure 2B:
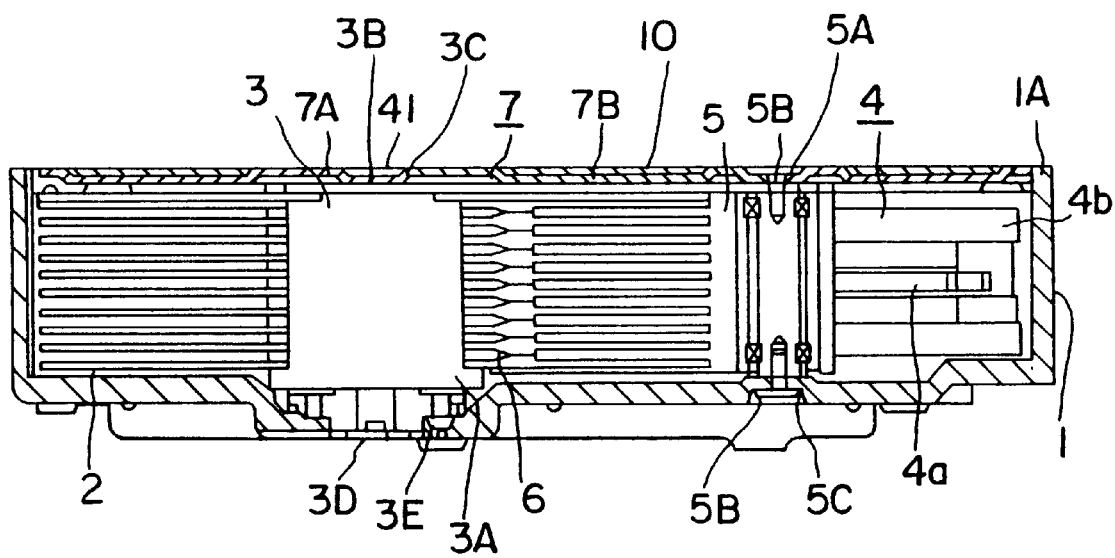
FIG. 2B is a cross sectional diagram in the length direction of the magnetic disk device shown in FIG. 1 in accordance with the first embodiment of the present invention.

As shown in FIGS. 1, 2A and 2B, the magnetic disk device 40 includes a housing (casing) having a base 1, which supports and contains the magnetic disk device 40 components, and a cover 7 to cover the base 1. The base 1 is formed as a deep bathtub type molding in order to provide the space within the base 1 in which the magnetic disk device 40 components are received.

The components received within the base 1 include a spindle motor 3 to drive ten (10) disks 2 at about 6,000 rpm, an actuator arm 5 to suspend read/write heads 6 which write signals onto the disks 2 and read signals from the disks 2, and a voice coil motor 4 including coils 4a and magnetic circuit units 4b to drive the actuator arm 5.

As shown in FIG. 1, the cover 7 is a thin sheet including a plurality of grooves 8A formed in a peripheral surface 7C by press technology. Screw through holes 8B, 3C and 5B are formed in a center portion of the respective grooves 8A through which screws 8C are inserted.

The top of the spindle motor 3 and the top of a shaft 5A of the actuator arm 5 each have a greater height than the other components supported on the base 1. The receiving space of the housing is maintained by positioning the top of the spindle motor 3 and the top of the shaft 5A to respectively face protruding surfaces 7A of the cover 7. Furthermore, respective screw holes 3C, 5B are formed in a shaft 3B of the spindle motor 3 and in the shaft 5A of the actuator arm 5, and are connected with screws via the screw holes in the grooves 8A of the cover 7 and via the screw holes 3C and 5B.

The cover 7 includes a surface 7B peripheral to the protruding surface 7A and at a level different from the protruding surface 7A (surfaces 7A and 7C are at the same level). A damping plate 10 comprising a rolled steel plate is affixed to the cover 7 by an adhesive or tackifier via a vibration absorbing material (VEM). The damping plate 10 is shaped to cover the periphery of the upper portions of the spindle motor 3 and the actuator arm 5, and prevents vibration of the spindle motor 3 and the actuator arm 5, thereby preventing generation of vibration noise.

The cover 7 is formed to fit into the inner peripheral surface of the base 1. More particularly, mounting surfaces 1E are disposed on wall portions of the base 1 at a level which is lower than an upper surface 1A of the base 1 by the thickness of the cover 7. Further, the external form of the cover 7 is smaller than the internal form of the base 1, and, as shown in FIG. 2B, when the cover 7 is mounted in the base 1 the upper surface 1A of the base 1 is at the same level as the cover 7 and is exposed in an unobstructed manner.

As shown in FIG. 2B, when the cover 7 is mounted on the base 1, the upper end surface of the cover 7 does not project upward from the upper end surface 1A of the base 1. Accordingly, the upper end surface of the cover 7 and the upper end surface 1A of the base 1 are about the same height.

Moreover, the upper end surface of the damping plate 10 also does not project beyond the upper end surface 1A of the base 1, and the respective levels of the damping plate 10 and the cover surface 7B are at about the same height.

The magnetic disk device shown in FIGS. 1, 2A and 2B in accordance with the first embodiment of the present invention provides ease of operation of affixing a closure seal 41. Further, the formation of air bubbles due to differences in level, or failure of the closure seal 41, can be prevented. Moreover, because the screw engagement surfaces around the screw holes are disposed lower than the surfaces of the protruding surfaces 7A, 7C, the screw heads do not protrude from the surfaces of the protruding surfaces 7A, 7C, and the screw heads do not protrude above the upper end surface 1A of the base 1.

However, the cover 7 is not limited to a cover having screw hole grooves 8A, and the cover 7 can be attached to the base 1 using dish screws without disposing screw hole grooves 8A in the cover 7. When dish screws are used to attach the cover 7, there is practically no protrusion because the screw heads of the dish screws have a flat dish form. Therefore, it is possible to affix the closure seal 41 directly on the screw heads.

Furthermore, a portion of the bottom surface of the base 1 which faces brushes 3A of the spindle motor 3 protrudes outward, and the protruding portion and a portion of the brushes 3A are engaged by a screw 3E. Further, at the other end of the spindle motor 3, the shaft 3B and the cover 7 are engaged and fixed by screws. Accordingly, the spindle motor 3 is supported by both the base 1 and the cover 7, thereby reducing the vibration of the spindle motor 3.

An aperture 48 is formed in a bottom surface of the base 1 through which a connector (not shown) fits for leading a flexible printed sheet 47 out to the exterior of the housing to conduct signals of the heads 6. The connector fitted in the aperture 48 is coupled to a connector (not shown) on a printed circuit board 49, disposed outside the base 1, on which a circuit is formed to perform servo control, signal processing and the like.

After the above-described principal components and the like are situated in the base 1 and the cover 7, on which the damping plate 10 is mounted, is secured to the base 1, a closure seal 41 is affixed to the housing. The closure seal 41 is a single sheet through which air does not pass and has a size to at least partially cover the upper surface 1A of the base 1.

Furthermore, the size of the closure seal 41 corresponds generally to the external size of the upper surface of the housing; however, the dimensions of the closure seal 41 may be larger, smaller or the same size as the upper surface of the housing. For example, the closure seal 41 may be about the same size as the upper surface of the housing. Alternatively, the size of the closure seal 41 may be larger than the upper surface of the housing, and by turning the closure seal 41 down and affixing the closure seal 41 to the outer surface of the housing, operability can be further increased. When the closure seal 41 is larger than the upper surface of the housing and is affixed to the outer surface of the housing, the closure seal 41 affixing area of the boundary portion of the cover 7 and the base 1 is reliably maintained.

Furthermore, the closure seal 41 may be made slightly smaller than the upper surface of the housing so that the closure seal 41 does not bulge out from the exterior periphery of the housing. By making the closure seal 41 slightly smaller than the upper surface of the housing, the sealing is prevented from being damaged. More particularly, if the end surface of the closure seal 41 bulges out from the stipulated dimensions, the closure seal 41 may peel off, and dust or air enters the device. For example, when the disk storage device is built into a desktop computer, laptop computer or the like personal computer, the closure seal 41 ends up peeling off. Moreover, if the closure seal 41 is made smaller than the upper surface of the housing, the operation of mounting the closure seal 41 can be performed without having to be careful about bulging out of an end surface of the closure seal 41, and a disk storage device with increased operability can be achieved.

Accordingly, as described above, by using a large-sized closure seal 41, the closure seal 41 fully covers the grooves 8A of the cover 7, and air flow into the housing via the screw holes 8B of the grooves 8A is completely prevented. Moreover, after the process of affixing the closure seal 41 is performed, an increase in operability can be achieved.

Moreover, it is also necessary to affix a closure seal to the bottom surface of the base 1 to close off air from flowing in when components are exposed on the bottom surface of the base 1. As shown in FIG. 2B, the spindle motor 3 is fixed with respect to the base 1 by the screw 3E, and a closure seal 3D is affixed to seal the screw 3E area of the base 1. Further, the actuator 5 is fixed with respect to the base 1 with the screw 5B, and a closure seal 5C is affixed to seal the base 1.

The closure seals 3D and 5C have a size which covers and conceals the sealing location periphery. However, it is possible to increase operability by using a closure seal which covers the entire lower surface of the base 1. Furthermore, in order for the closure seals 41, 3D and 5C to seal the housing such that air does not pass through, the entire surface of the respective closure seals 41, 3D and 5C are coated with a tackifier or an adhesive.

The closure seal 41 is made of a material through which air does not pass. In selecting a material for the closure seal 41, strength, corrosion resistance and durability must be taken into consideration. In accordance with preferred embodiments of the present invention, an aluminum vapor-deposited polyester film is used as the closure seal 41, in consideration of strength, corrosion resistance and durability.

Moreover, a copper seal can be used as a noise countermeasure inside and outside of the storage device 40.

In accordance with the first embodiment of the present invention shown in FIGS. 1, 2A and 2B, bubbles can result during the operation of affixing the closure seal 41 because the closure seal 41 comprises a sheet having a size which about covers the upper surface of the housing. The bubbles formed during the affixing operation may bulge out from the prescribed dimensions of the disk storage device, resulting in impairment of the closure seal when the device is built into the body of a computer, or the like, damaging the sealing. Moreover, the residual air in the bubbles swells due to a high ambient temperature, and the closure seal is damaged and sealing is lost.

Thus, it is desirable to reliably affix the closure seal 41 to the housing without generating air bubbles in between the sheet comprising the closure seal 41 and the housing. The formation of air bubbles can be prevented by disposing at least one hole for ventilation in the closure seal 41 in places which are sufficiently separated from the portions of the storage device which are to be sealed. The at least one ventilation hole allows the air to escape when the closure seal 41 is affixed and the surface is pressed.

Figure 3A:
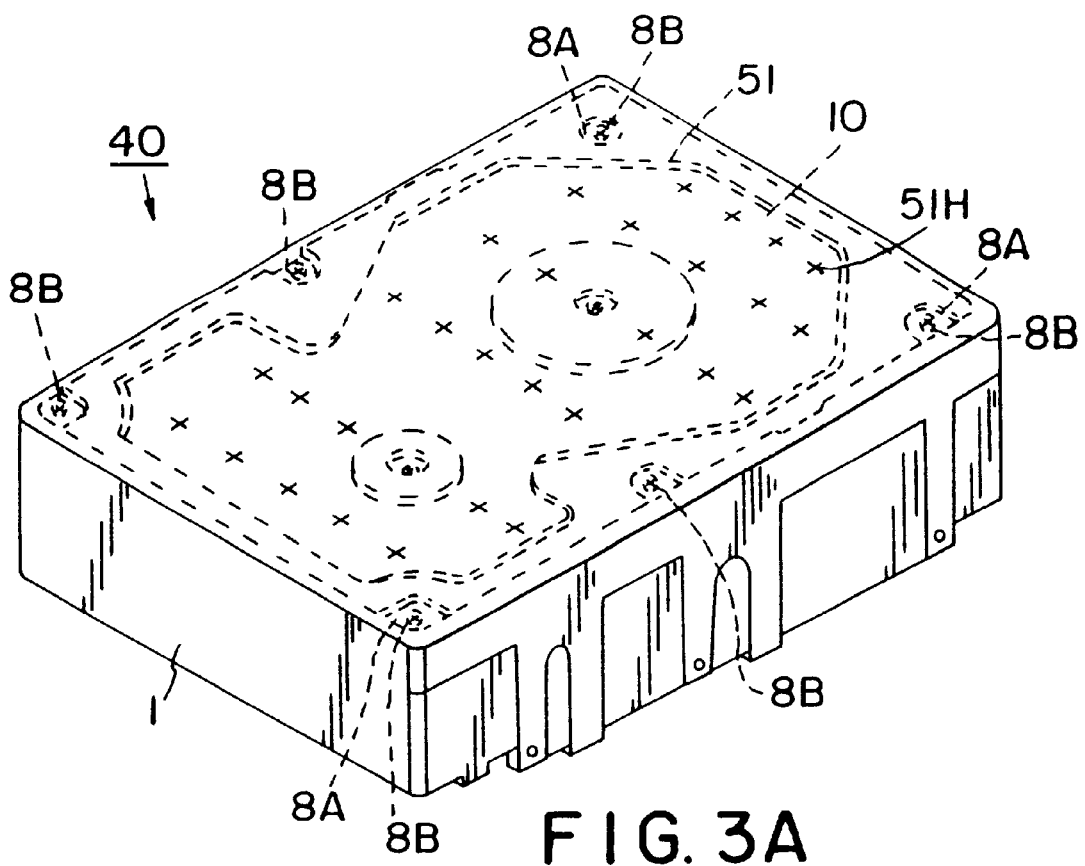
FIG. 3A is a perspective view of a magnetic disk device having a closure seal in accordance with a second embodiment of the present invention.
Figure 3B:
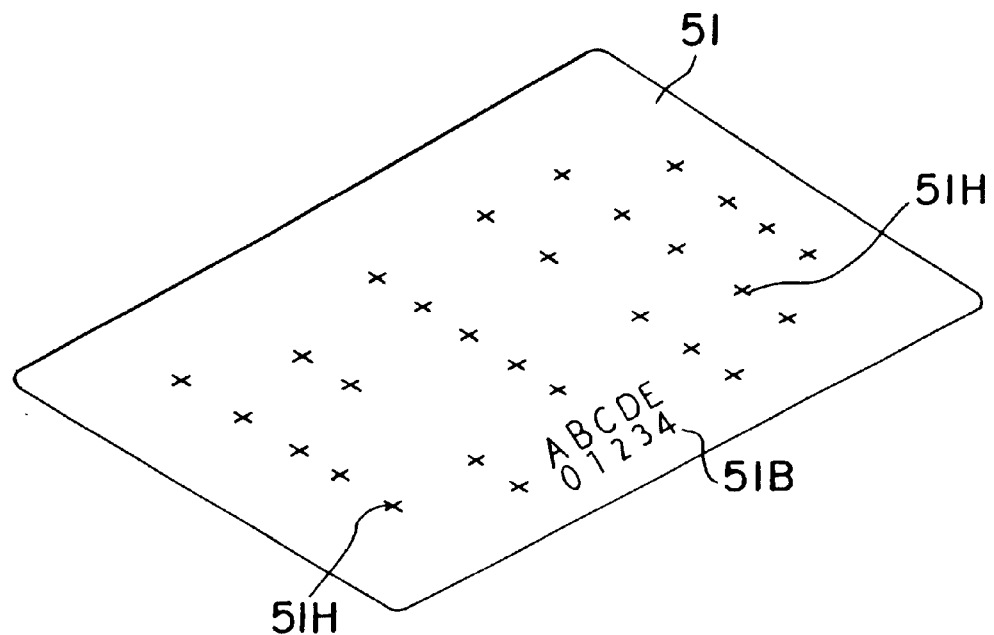
FIG. 3B is a diagram of the closure seal in accordance with the second embodiment of the present invention.

FIG. 3A is a perspective view of a disk storage device 40 having a closure seal 51 which includes ventilation holes 51H in accordance with a second embodiment of the present invention. FIG. 3B is a diagram of the closure seal 51 in accordance with the second embodiment of the present invention. The elements shown in FIG. 3A and 3B in accordance with the second embodiment of the present invention which are the same as or similar to those shown in FIG. 1 and are referred to by the same reference numerals, and detailed description of these like elements is omitted.

As shown in FIGS. 3A and 3B, the closure seal 51 includes through holes 51H having a cross shape for ventilation. The closure seal 51 shown in FIGS. 3A and 3B is the same as the closure seal 41 shown in FIG. 1, except the closure seal 51 includes the through holes 51H.

In accordance with the second embodiment of the present invention, the closure seal 51, includes at least one cross-shaped ventilation through hole 51H having a size which is about 2–3 mm. The spacing of the ventilation through holes 51H is determined taking into account the tensile strength and durability of the closure seal 51 so that the closure seal 51 is not damaged during affixing, and is at least 1 mm.

Moreover, the ventilation through holes 51H may be numerous small holes disposed as shown in FIG. 3A and 3B; however, similar results are obtained with fewer, larger ventilation through holes 51H.

Furthermore, care has to be taken that the ventilation through holes 51H are located in positions which are sufficiently well separated from the positions which have to be sealed, so that sealing of the storage device is not lost during the affixing of the closure seal 51. More specifically, the ventilation through holes 51H are disposed in positions which do not hinder the respective sealing functions in the gap (boundary) which occurs when the base 1 and cover 7 are fitted together, in the screw hole 3B of the spindle, in the screw hole 5B of the actuator, and the like positions.

In accordance with the second embodiment of the present invention, the closure seal 51 is affixed to the surface of the housing such that the ventilation through holes 51H are preferably in positions separated by about at least 1 mm from the sealing positions. Moreover, when characters, symbols or drawings of instructions for the storage device are printed on the closure seal 51, the position of the ventilation through holes 51H is selected taking into account these positions to avoid the display positions 51B of the characters, symbols, drawings and the like.

Figure 4A:
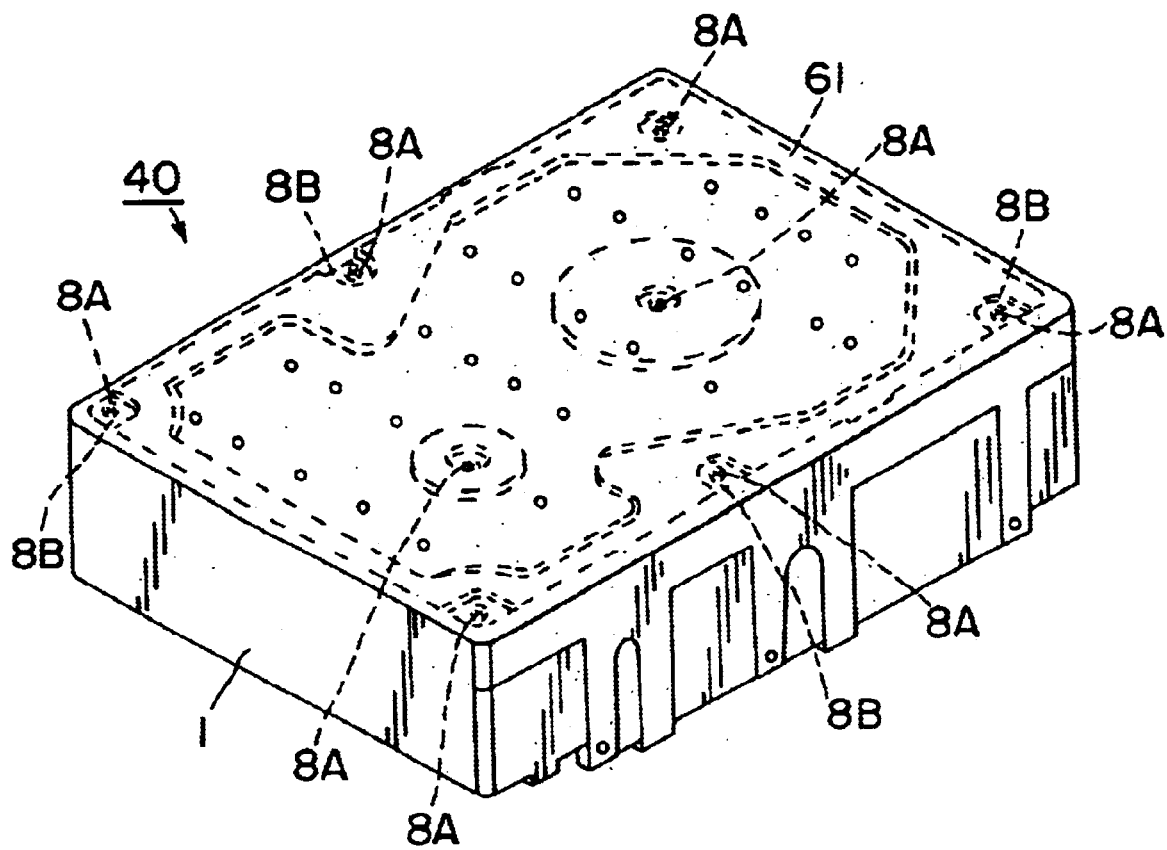
FIG. 4A is a perspective view of a magnetic disk device having a closure seal in accordance with a modification of the second embodiment of the present invention.
Figure 4B:
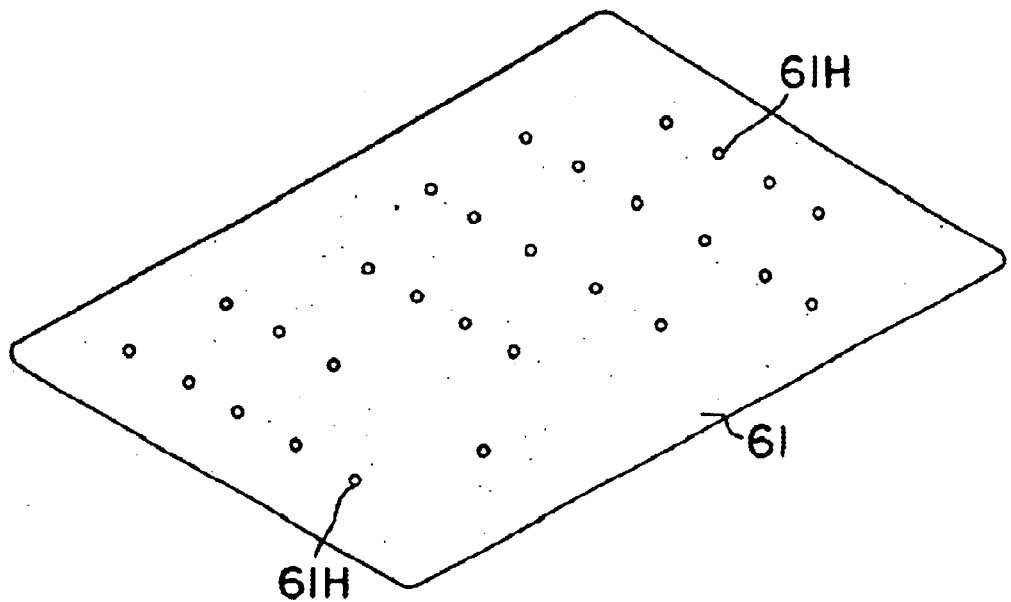
FIG. 4B is a diagram illustrating the closure seal in accordance with the modification of the second embodiment of the present invention.

FIGS. 4A and 4B illustrate an embodiment of the present invention having a modified form of the ventilation through holes illustrated in FIG. 3. Elements shown in FIGS. 4A and 4B which are the same as or similar to those shown in FIG. 3 are referred to by like reference numerals, and a detailed description of these like elements is omitted. More specifically, FIG. 4A is a perspective view of a disk storage device having a closure seal 61 including at least one ventilation through hole 61H having an approximately circular shape. FIG. 4B is a diagram illustrating the closure seal 61.

In accordance with the embodiment of the invention shown in FIGS. 4A and 4B, the closure seal 61 is similar to the closure seal 41 shown in FIG. 1, except the closure seal 61 includes at least one ventilation through hole 61H formed in a circular shape or in an approximately circular shape. The diameter of the ventilation through holes 61H is about 2–3 mm. The spacing of the ventilation through holes 61H is selected taking into account the tensile strength and durability of the closure seal 61 so that the closure seal 61 is not damaged during affixing, and is at least about 1 mm.

In a manner similar to the embodiment of the invention shown in FIG. 3, the ventilation through holes 61H are disposed in positions which do not hinder the respective sealing functions in the gap (boundary) which occurs when the base 1 and cover 7 are fitted together, in the screw holes 8B of the grooves 8A, in the screw hole 3B of the spindle 3, in the screw hole 5B of the actuator 5, and the like. The closure seal 61 is affixed to the surface of the housing so that the ventilation through holes 61H are positioned at a spacing of about at least 1 mm from, the sealing positions.

Furthermore, in accordance with the embodiments of the invention shown in FIGS. 3A, 3B, 4A and 4B, ventilation through holes are shown which have a cross shape, and a circular shape or an approximately circular shape; however, similar results are obtained when the ventilation through holes have a triangular shape, a star shape, or other polygonal shape.

Figure 5:
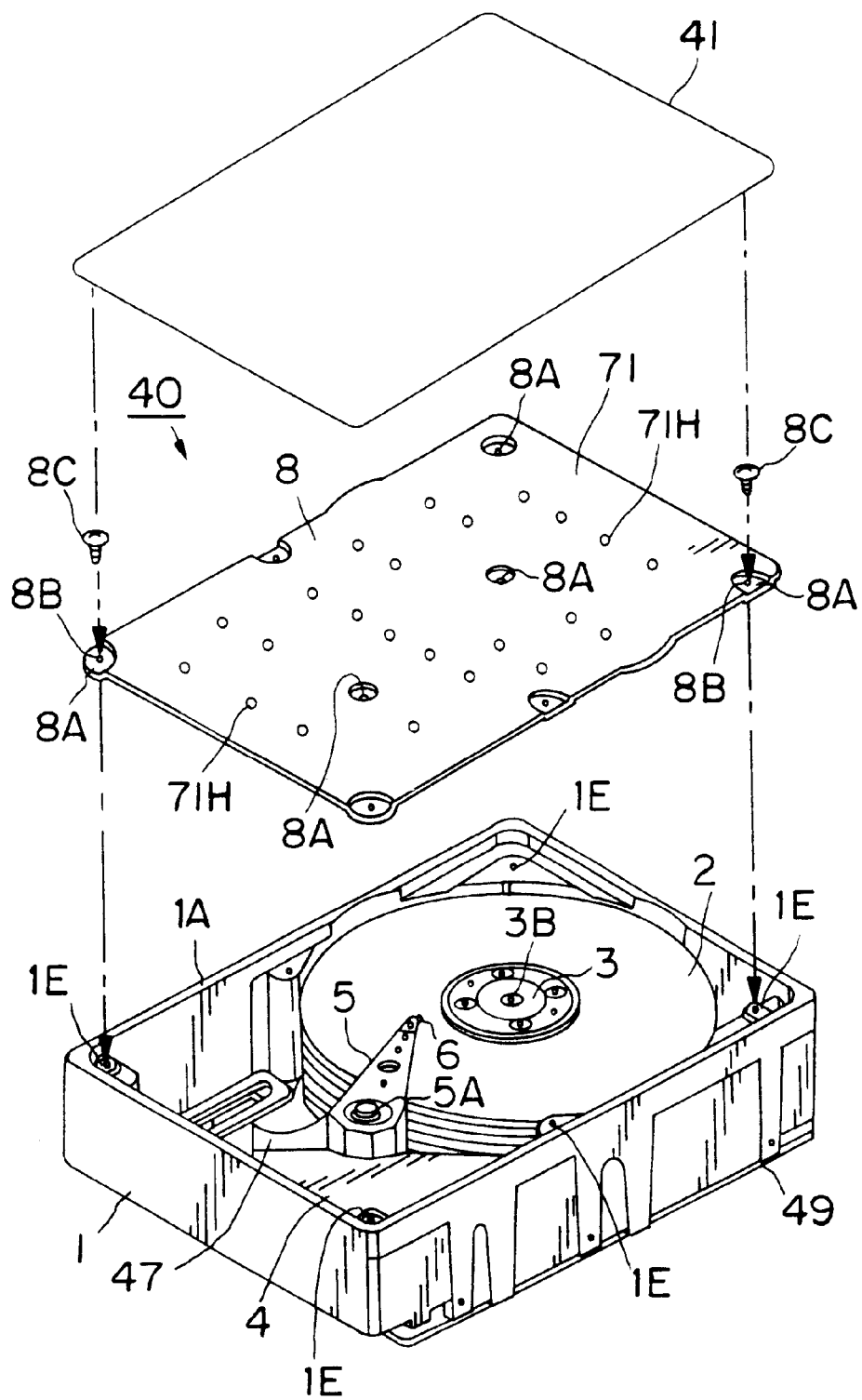
FIG. 5 is an exploded oblique view of a magnetic disk device in accordance with the third embodiment of the present invention.

FIG. 5 is an exploded oblique diagram of a disk storage device 40 in accordance with a third embodiment of the present invention. Elements shown in FIG. 5 which are the same as or similar to those shown in FIG. 1 are referred to by like reference numerals, and a detailed description of these like elements is omitted.

In accordance with the embodiment of the present invention shown in FIG. 5, the cover 7 of FIG. 1 is modified. More particularly, in accordance with the third embodiment of the present invention, at least one ventilation hole 71H is provided in a flat surface portion of a cover 71. As shown in FIG. 5, because the ventilation holes 71H are disposed in the cover 7 which has thickness, the ventilation holes 71H may be either through holes or sunken holes, rather than through holes. Moreover, the ventilation through holes or sunken holes 71H are preferably formed by press technology, although the ventilation holes 71H can be formed by other suitable methods of forming through holes or sunken holes. In the case of forming sunken holes, in order to form a structure which allows for the escape of air, the hole structure is formed in the surface of the cover 71. If through holes are formed, the through holes are perforated in the thickness direction of the cover 71.

Furthermore, since the ventilation holes 71H are disposed in the cover 71, the number and size of the ventilation holes 71H provided in the cover 71 are determined by taking into account the rigidity and vibration resistance of the cover 71. Accordingly, the ventilation holes 71H are made fairly small so as not to lose rigidity, particularly in the neighborhood of the spindle 3 or the actuator arm 5, which are sources of vibration.

In a manner similar to the embodiment of the invention shown in FIG. 1, the closure seal 41 shown in FIG. 5 comprises a single sheet of material through which air does not pass. The closure seal 41 completely covers the surface of the cover 71, and also at least partially covers the upper surface 1A of the base 1. More particularly, the closure seal 41 is affixed so that the gap (boundary) which occurs when the base 1 and cover 71 are fitted together is completely obstructed to block the inflow of air. Further, the screw holes 8B of the grooves 8A are completely obstructed to prevent the inflow of air.

In accordance with the third embodiment of the present invention shown in FIG. 5, a side of the cover 71 is shown which does not include a damping plate. However, a damping plate can be disposed in the cover 71 in a manner similar to the cover 7 shown in FIG. 1. Further, the ventilation holes 71H may be disposed in the surface of the cover 71 eliminating to the damping plate. Alternatively, as described in more detail hereinbelow, ventilation holes may be disposed in both the cover and the damping plate.

FIG. 6 is an exploded oblique diagram of a disk storage device in accordance with a fourth embodiment of the present invention. Elements shown in FIG. 6 which are the same as or similar to those shown in FIG. 1 are referred to by like reference numerals, and a detailed description of these like elements is omitted. In accordance with the fourth embodiment of the present invention, the cover 7 includes a damping plate 100, which is the same as the damping plate 10 shown in FIG. 1 except that the damping plate 100 includes ventilation holes 100H.

In accordance with the fourth embodiment of the present invention, the ventilation holes 100H are formed in the damping plate 100 because the damping plate 100 constitutes a large portion of the surface facing the closure seal 41. The ventilation holes 100H are formed by press technology. Accordingly, since the ventilation holes 100H are formed in the damping plate 100, it is not necessary for holes to be disposed in the cover 7, as shown in FIG. 5, and there is no loss of sealing or rigidity of the cover 7. In accordance with the embodiment of the invention shown in FIG. 6, the ventilation holes 100H are through holes. However, the ventilation holes 100H can be formed as through holes or grooves, in a manner similar to that described above.

Further, in a manner similar to the embodiment of the invention shown in FIG. 1, the closure seal 41 in accordance with the embodiment of the invention shown in FIG. 6 comprises one sheet of material through which air does not pass, completely covering the surface of the cover 7, and also at least partially covering the upper surface 1A of the base 1. More particularly, the closure seal 41 is affixed so that each of the gap (boundary) which occurs when the base 1 and cover 7 are fitted together, the screw holes 8B of the grooves 8A, and the ventilation holes 100H, are completely obstructed to prevent the inflow of air.

Furthermore, in accordance with the fourth embodiment of the present invention, the shape of the ventilation holes 100H in the damping plate 100 may be approximately circular, polygonal, cross-shaped, and all possible modifications.

Moreover, the function of the ventilation holes 100H can be improved by taking into account for air to escape through holes disposed toward the cover 7 facing the damping plate 100 while affixing the closure seal 41 during the assembly process. Accordingly, air escapes from plural associated ventilation holes 100H by not adhering the central portion of the damping plate 100.

In accordance with the embodiments of the invention shown in FIG. 1, FIG. 5 and FIG. 6, the closure seal 41 has been described as comprising one sheet of material through which air does not pass. However, the closure seal 41 shown in FIGS. 1, 5 and 6 may also include breathing through holes which communicate with breathing holes in the cover, base or damping plate to cause air to flow in and out to adjust the air pressure in the interior of the storage device, while reliably maintaining sealing at the sealing positions. More particularly, the closure seal 41 includes at least one through hole which is disposed facing the breathing holes in the cover, base or damping plate so that the breathing holes disposed in the cover, base or the damping plate are not obstructed. If the external periphery of the closure seal 41 having at least one through hole is reliably sealed with tackifier or adhesive, then these through holes, which communicate breathing through holes in the cover, base or damping plate, function as ventilation through holes.

The embodiments of the present invention described above relate to affixing a closure seal over the entire surface of the housing. More particularly, in accordance with embodiments of the present invention described above, the closure seal 41 is affixed over a surface area which is to some degree wide, and by disposing ventilation holes in the closure seal 41 or the surface to which the closure seal 41 is affixed air bubbles are not generated. As a result, the closure seal can be affixed neatly and flatly. Of course, the present invention is not limited to a device having a closure seal affixed to a surface area which is about the same size as the cover, and the principals of the present invention are also applicable to a closure seal which is affixed to a surface far smaller than the cover.

An embodiment of the present invention will now be described below, wherein a closure seal is sufficiently smaller than the surface area of the cover. FIG. 7 is an exploded oblique view of a disk storage device having a closure seal which is smaller than the surface area of the cover in accordance with a fifth embodiment of the present invention. Elements of the disk storage device shown in FIG. 7 which are the same as or similar to the elements shown in FIG. 1 are referred to by the same reference numerals, and a detailed description of these like elements will be omitted.

As shown in FIG. 7, five (5) disks 26 are loaded onto a spindle motor 24 which is driven to rotate at about 6,000 rpm. To decrease the vibration of the spindle motor 24, the spindle motor 24 is secured at both ends. In particular, one end of the spindle motor 24 is press fixed in the base 43. A screw hole 24B is formed in the shaft of the other end of the spindle motor 24 and a screw is tightened and fixed via a screw hole 42B in the cover 42, as a double support of the spindle motor 24.

Heads 33 to record data, play back data, and the like, from the disks 26 are supported at one end of a suspension 46. The suspension 46 urges the heads 33 to be pressed to the disks 26 when the rotation of the disks 26 stops, thereby stopping in a contact start stop (CSS) region on the surface of the disk 26. When the disk 26 is driven rotationally, the flow of air as a result of the rotation generates a negative pressure to float the heads 33 above the surface.

An actuator arm 45 moves the heads 33 in a radial direction to a target track of the disk 26. A voice coil motor 44 comprising a magnetic circuit 45A and a coil 45B drives the actuator arm 45 such that the actuator arm 45 moves in a radial direction of the disk 26. The magnetic circuit 45A comprises a magnet and yoke, and is disposed toward the base of the actuator arm 45. Further, the coil 45B is disposed at one end of the actuator arm 45 to face the magnetic circuit 45A. Moreover, to reduce the vibration of the actuator arm 45, a shaft is fixed to the base 43, and a screw is fixed to the cover 42 with a screw via a screw hole 42B in the cover 42.

One end of a flexible printed sheet 37 is connected to a printed circuit board 69 disposed on a side of the base 43 via a connector 37A disposed in the base 43. The base 43 is screw connected to the cover 42 with a plurality of screws via a packing (not shown in the drawing) via screw holes 43E disposed in the base 43 and screw holes 42A of the cover 42, to form a sealed structure. Furthermore, a closure seal 42C, which is somewhat larger than the size of the respective screw holes 42A, is affixed after the screws are tightened. Of course, it is possible to completely cover the cover 42 using a single sheet closure seal, as described above in accordance with the first through third embodiments of the present invention.

A metal plate 50 is adhered to the cover 42 with a viscous elastic material, such as Scotchdamp™, manufactured by 3M. The metal plate 50 and the viscous elastic material reduce the vibration of the cover 42, thereby lowering the noise generated by the disk drive. More particularly, since the cover 42 is thin, the cover 42 tends to vibrate. For example, when magnetic disks 26 are mounted on the spindle motor 24 and the spindle motor 24 is driven to rotate the magnetic disks 26, the portion of the cover 42 located immediately above the spindle motor 24 generates acoustic noise. The metal plate 50 adhered with a viscous elastic material absorbs the acoustic noise and the acoustic noise is thereby lowered or eliminated.

In accordance with the fifth embodiment of the invention show in FIG. 7, all the apertures enabling air to enter or leave the disk storage device are obstructed, except for breathing holes 29, which include filters (not shown in the drawing) and which are located for air pressure adjustment in the device interior. For example, the breathing holes 29 are located in the cover 42 and in the metal plate 50. In the above-described manner, a flawless sealing structure is designed for the interior of a disk storage device, and a flow of air from the exterior of the device, particularly, an inflow of dust-laden air, is prevented.

As shown in FIG. 7, a large aperture 52 is disposed in a portion of the cover 42. In accordance with the fifth embodiment of the present invention, the aperture 52 is disposed in a portion of the cover 42 which faces the yoke of the magnetic circuit 45A of the voice coil motor 44. By locating the yoke in the interior of the aperture 52, the thickness of the cover 42 can be reduced, and a miniaturization of the overall height of the device body from the base 43 to the end of the cover 42 can be achieved. Consequently, it is necessary for the large aperture 52 to be sealed.

However, because the closure seal itself is not very strong, a large aperture 52 covered with the closure seal comprising a single sheet, may, in some cases, break as a result of a slight impact. Therefore, in accordance with the fifth embodiment of the present invention, an intermediate member 65 to reinforce a closure seal 66 is affixed such that the intermediate member 65 completely covers the aperture 52. Accordingly, the strength and durability of the closure seal 66 are increased. The reinforcing intermediate member 65 may comprise an aluminum alloy or the like thin metal sheet, a plastic or Mylar film, rubber, or the like resinous sheet.

Moreover, in accordance with the fourth embodiment of the present invention, the reinforcing intermediate member 65 includes ventilation holes 65H disposed therein. Accordingly, when the closure seal 66 and the reinforcing intermediate member 65 are affixed, air can escape by pressing the closure seal 66 on the affixing surface. As a result, and the formation of bubbles is prevented, and a neat, flat affixing of the closure seal 66 is effected.

Alternatively, a similar effect can be obtained if ventilation holes are disposed in the closure seal 66, and ventilation holes are not disposed in the reinforcing intermediate member 65. In the case that ventilation holes are formed in the closure seal 66, it is necessary to design placement of the ventilation holes to avoid a location 67 in which characters, symbols, diagrams and the like are printed.

In accordance with embodiments of the present invention described hereinabove, a closure seal is provided to cover an entire surface of a housing. However, a closure seal can be used which, when affixed, has a surface area size rather larger than the size of the required seal. Ventilation holes are formed in the closure seal or in the affixing surface, separated from screw holes or the boundary of the cover and base, or separated from a seal of the mounting places of an actuator or spindle or the like.

Moreover, in accordance with embodiments of the present invention, the ventilation holes may be disposed not only in one of the closure seal or the affixing surface, but in both the closure seal and the affixing surface with similar effects.

Furthermore, the ventilation holes do not face apertures which communicate with the device interior, except in the case of the combined use of breathing holes.

The storage device in accordance with embodiments of the present invention described hereinabove reliably seals the apertures of the storage device, and prevents air from flowing into and out of the device.

Moreover, by using only one closure seal, a plurality of apertures can be sealed at once with a single operation of affixing a single sheet closure seal, and increased operability can be achieved.

Moreover, by using one closure seal to cover the upper surface of the housing, a flattening of the surface of the housing is achieved, and the device can be accurately finished to the prescribed size.

Furthermore, in accordance with embodiments of the present invention, the generation of air bubbles during the affixing of the closure seal can be prevented by disposing ventilation holes in the closure seal or in the affixing surface, thereby preventing damage to the sealing due to the swelling of the air bubbles. Further, the ventilation holes in the closure seal or the affixing surface allow reliable flattening of the surface of the housing. Consequently, because the durability of the closure seal can be increased, the environment within the device can be maintained for a long period, and it becomes possible to increase the durability and reliability of the storage device.

Although a few preferred embodiments of the present invention have been shown and described, it will be appreciated by those skilled in the art that changes may be made in the embodiments without departing from the principles and spirit of the invention, the scope of which is defined in the appended claims and their equivalents.

What is claimed is:

1. A disk storage device comprising:
   a base to support an actuator device to access a storage medium, the base having an opening with a flat top edge surface;
   a cover received within the opening of the base at the top edge surface of the base with a space therebetween and attached to the base through at least one perforation in the cover, the cover having an exterior surface with a raised substantially flat portion around the at least one perforation, said raised substantially flat portion being co-planar with the top edge surface of the base,
   wherein the cover further includes a recessed, substantially flat portion;
   a damping plate member mounted in the recessed, substantially flat portion of the cover and including at least one hole to accommodate the raised substantially flat portion,
   a sheet seal affixed to the raised substantially flat portion of the cover, the damping plate, and the top edge surface of the base to seal the at least one perforation and the space between the top edge surface of the base and the cover.

2. A storage device as recited in claim 1, wherein said sheet seal covers substantially an entire area of both the co-planar substantially with a space there between flat portion of the cover and the top edge surface of the base.

3. A storage device as recited in claim 1, wherein the at least one perforation is a hole for inserting a screw to fasten one end of the actuator device to the cover.

4. A storage device as recited in claim 1, wherein the sheet seal includes a hole in a position separated from the raised substantially flat portion.

5. A storage device as recited in claim 4, wherein the hole of the sheet seal is separated by at least 1 mm from the raised substantially flat portion.

6. A storage device as recited in claim 4, wherein the hole of the sheet seal has one of a circular, polygonal or cross-shaped configuration.

7. A storage device as recited in claim 1, wherein the sheet seal comprises a single sheet of material that is impermeable to air.

8. A storage device as recited in claim 1, wherein the sheet seal covers a portion of an outer surface of the base perpendicular to the flat top edge surface.

9. A storage device as recited in claim 1, wherein the sheet seal includes a hole.

10. A storage device as recited in claim 1, wherein the sheet seal comprises an aluminum vapor-deposited polyester film.

11. A storage device as recited in claim 1, wherein the sheet seal is coated with an adhesive on a surface facing the exterior surface of the cover.

12. A storage device as recited in claim 1, wherein the cover comprises a plurality of holes.

13. A storage device, comprising:
   a base to support an actuator device to access a storage medium, the base including an opening with a flat top edge surface;
   a cover received within the opening of the base at the top edge surface of the base with a space therebetween and attached to the base through at least two holes formed in the cover and the base, respectively,
   wherein one of the holes is formed in a first raised substantially flat peripheral portion of the cover, and another of the holes is formed in a second raised substantially flat interior portion of the cover,
   wherein said top edge surface of the base, the first raised substantially flat peripheral portion and the second raised, substantially flat portion are co-planar, and
   a sheet seal affixed to the cover at the first and second raised substantially flat portions and the top edge surface of the base to seal the two holes and the space between the cover and the base.

14. A storage device as recited in claim 13, wherein a hole is formed in the sheet seal at a position separated by at least 1 mm from any one of the at least two holes formed in the cover.

15. A storage device as recited in claim 13, wherein the hole formed in the sheet seal has one of a circular, polygonal or cross-shaped configuration.

16. A device, comprising:
   a base having a top, a bottom, sides and an opening to receive a disk drive;
   a cover having an exterior surface and including a plurality of first holes,
   wherein the base has a flat top edge around the opening, the cover has a flat peripheral edge, the base top edge receives therewithin the cover peripheral edge, and the top flat edge of the base and the flat peripheral edge of the cover are co-planar;
   wherein the cover is attached to the base through the plurality of first holes formed in the cover, a damping plate received within the cover and having at least one ventilation hole to allow air to pass through the damping plate; and a sheet seal that extends beyond the edges and seals, in an airtight manner, the plurality of first holes and the at least one ventilation hole and the edges.

17. The device as recited in claim 16, wherein the exterior surface of the cover includes a plurality of raised substantially flat portions co-planar with the flat top edge of the base and the flat peripheral edge of the cover, and at least one of the plurality of first holes is formed in each of the plurality of raised substantially flat portions.

18. The device as recited in claim 16, wherein said sheet seal covers substantially an entire area of both the exterior surface of the cover and the top of the base.

19. The device as recited in claim 16, wherein each of the plurality of first holes is a screw hole that receives a screw for attaching one of the cover to the base and the cover to the disk drive, wherein each of the screws has a top which is co-planar with the top flat portion of the base and the flat peripheral edge of the cover.

20. The device as recited in claim 16, wherein the sheet seal includes at least one hole in a position separated from the plurality of holes formed in the cover, and allowing air to pass through the sheet seal, when the sheet seal is attached to the exterior surface of the cover.

21. The device as recited in claim 16, wherein the sheet seal is an aluminum vapor-deposited polyester film.

22. The device as recited in claim 16, wherein the sheet seal is coated with an adhesive on a surface attached to the exterior surface of the cover.

23. A storage device as recited in claim 20, wherein the hole of the sheet seal has one of a circular, polygonal and cross-shaped configuration.

24. A storage device as recited in claim 20, wherein the sheet seal includes a surface portion having markings, and the at least one hole of the sheet seal is spaced from the markings on the sheet seal.

25. The device as recited in claim 16, wherein the cover includes at least one ventilation hole to allow air to pass through the cover, when the sheet seal is attached to the exterior surface of the cover.

26. The device as recited in claim 21, wherein the base includes at least one hole, and a second sheet seal extends over the at least one hole of the base and seals, in an airtight manner, the at least one hole in the base.

27. The device as recited in claim 20, wherein the at least one hole is about 2–3 mm wide.

28. The device as recited in claim 20, wherein the at least one hole is a plurality of holes spaced apart at least 1 mm from each other.

29. The device as recited in claim 20, wherein the at least one hole is spaced from each of the plurality of holes formed in the cover by at least 1 mm.

30. The device as recited in claim 24, wherein the spacing between the markings and the at least one hole formed in the sheet seal is at least 1 mm.

31. A device, comprising:
a base having a top, a bottom, sides and an opening to receive a disk drive;

a cover having an exterior surface, a first raised peripheral substantially flat portion with at least one screw hole formed therein, a second recessed substantially flat portion that is formed interiorly of the first portion, and a third raised substantially flat portion that is formed interiorly of the second portion with at least one screw hole;

a damping plate member mounted in the second portion of the cover and including at least one opening to accommodate the third portion therein, wherein the cover is received by the opening of the base and screws extend through the screw holes formed therein for attaching the cover to the base and the cover to the disk drive, respectively, and wherein the base has a top edge around the opening of the base, the cover has a peripheral edge, the base top edge receives therewithin the cover peripheral edge; and a sheet seal affixed to the exterior surface of the cover to extend over and seal in an airtight manner the edges and the screw holes, wherein the base includes at least one hole, and a second sheet seal extends over the at least one hole of the base and seals, in an airtight manner, the at least one hole in the base.

32. The device as recited in claim 31, wherein the cover includes a plurality of raised substantially flat portions, and at least one of the plurality of screw holes is formed in each of the plurality of raised substantially flat portions.

33. The device as recited in claim 31, wherein the sheet seal includes at least one vent hole in a position separated from the plurality of first screw holes, when the sheet seal is attached to the exterior surface of the cover.

34. The device as recited in claim 31, wherein the sheet seal is an aluminum vapor-deposited polyester film.

35. The device as recited in claim 31, wherein the sheet seal is coated with an adhesive on a surface attached to the exterior surface of the cover.

36. A storage device as recited in claim 33, wherein the at least one vent hole of the sheet seal has one of a circular, polygonal and cross-shaped configuration.

37. A storage device as recited in claim 31, wherein the sheet seal includes a surface portion having markings, and the at least one hole is spaced from the markings on the sheet seal.

38. The device as recited in claim 33, wherein the at least one vent hole is about 2–3 mm wide.

39. The device as recited in claim 33, wherein the at least one vent hole is a plurality of vent holes spaced apart at least 1 mm from each other.

40. The device as recited in claim 33, wherein the at least one vent hole is spaced from each of the plurality of screw holes by at least 1 mm.

41. The device as recited in claim 37, herein the spacing between the markings and the at least one vent hole is at least 1 mm.

* * * * *